United States Patent
Updegrave

(10) Patent No.: US 6,963,064 B2
(45) Date of Patent: Nov. 8, 2005

(54) MULTI-RESOLUTION REFLECTIVE OPTICAL INCREMENTAL ENCODER

(75) Inventor: Christopher L. Updegrave, Hatfield, PA (US)

(73) Assignee: PEM Management, Inc., Wilmington, DE (US)

( * ) Notice: Subject to any disclaimer, the term of this patent is extended or adjusted under 35 U.S.C. 154(b) by 337 days.

(21) Appl. No.: 10/457,403

(22) Filed: Jun. 10, 2003

(65) Prior Publication Data

US 2003/0230708 A1   Dec. 18, 2003

Related U.S. Application Data

(60) Provisional application No. 60/388,340, filed on Jun. 14, 2002.

(51) Int. Cl.[7] ............................................. G01D 5/34
(52) U.S. Cl. ........................ 250/231.13; 250/231.14; 341/13
(58) Field of Search ................ 250/231.13, 231.14, 250/231.16, 231.18, 237 R; 341/11, 13, 31; 33/1 N, 1 PT, 706, 707; 356/614–617

(56) References Cited

U.S. PATENT DOCUMENTS

| | | | |
|---|---|---|---|
| 3,562,726 A | 2/1971 | Hamilton | |
| 4,964,727 A | 10/1990 | Huggins | |
| 4,977,316 A | 12/1990 | Malcolm et al. | |
| 5,013,910 A | 5/1991 | Epstein | |
| 5,069,547 A | 12/1991 | Huggins et al. | |
| 5,237,391 A | 8/1993 | Huggins | |
| 5,332,895 A | 7/1994 | Rieder et al. | |
| 5,438,193 A | 8/1995 | Takagi et al. | |
| 6,084,234 A * | 7/2000 | Stridsberg | 250/231.16 |
| 6,160,499 A | 12/2000 | Arinaga et al. | |
| 6,175,109 B1 | 1/2001 | Setbacken et al. | |
| 6,518,893 B1 * | 2/2003 | Robinson | 341/56 |
| 6,727,493 B2 * | 4/2004 | Franklin et al. | 250/231.13 |

\* cited by examiner

Primary Examiner—Stephone B. Allen
(74) Attorney, Agent, or Firm—Gregory J. Gore

(57) ABSTRACT

In order to provide multiple resolution capabilities in an encoder device with the fewest number of parts, a single circuit board platform is provided with multiple chip buses electrically connected in parallel. Each bus is located adjacent a different code disc track wherein the code disc includes multiple concentric tracks of different resolution. The chip buses are compatible with either a surface mounted or a plug-in mounted encoder module assembled to a printed circuit board platform having alternate disc track read locations provided by separate encoder module bus ports. To change resolution the encoder module chip is simply moved from one bus to an alternate resolution bus on the PC board that lies adjacent a different code disc resolution track. In one embodiment, the PC board is mounted to the housing and the electric motor and the code disc is mounted on the rotary motor shaft in order to provide shaft angle position for electrically controlling the operation of the motor.

8 Claims, 2 Drawing Sheets

PRIOR ART

MULTI-RESOLUTION REFLECTIVE OPTICAL INCREMENTAL ENCODER

The present application is related to provisional patent application Ser. No. 60/388,340 entitled "Multi-Resolution Reflective Optical Incremental Encoder" filed on Jun. 14, 2002, priority from which is hereby claimed.

FIELD OF THE INVENTION

The present invention relates to optical rotary encoders for determining speed and position. More specifically, it discloses an optical incremental encoder used to control the operation of an electric motor.

BACKGROUND OF THE INVENTION

Encoders convert angular position into electrical signals and can employ different ways to detect angular or rotary motion such as mechanical means utilizing brush contacts or magnet/inductive methods. But the most common, reliable and widely used devices are non-contact optical receptors employed by optical encoders. Optical encoders are generally of two different types: incremental and absolute position. Incremental-type encoders are the simpler of the two and are either of the reflective or transmissive type.

Reflective optical encoders are comprised of three basic active elements: a light source, a photo-detector and a reflective code disc. These three basic parts along with a few other passive components generate a series of electrical square wave pulses as a code disc mounted on a shaft rotates past the light source and detector on the encoder module chip. The number of lines or bars on the disc determines an incremental encoder's resolution during one revolution. The evenly-spaced opaque radial lines on the reflective surface of the disc cause interruptions that act as a shutter to alternatively open and close the light path from the light source to the photo detector. The electronic signal generated by light falling on the photo detector is amplified within the encoder module and converted to a square wave with "high" and "low" values corresponding to light present or absent at the photocell, respectively. The span of one "high" and one "low" is known as one full cycle or 360 electrical degrees.

In addition to shaft position, rotary encoders can also indicate speed and direction of motion. Electronics integral within the encoder module generates two separate channels that work together. The two channels are in quadrature, or out of phase by 90 electrical degrees. This offset of the two separate waveforms produces four distinct states within each electrical cycle.

When used for electric motor commutation, the incremental rotary encoder is typically assembled directly to the motor's back end on an extension of the motor shaft. Another method is to attach the encoder directly to a load's rotating shaft or member. The shaft position encoder is only one part of the circuit which, along with receiving electronics such as counters or controllers, completes the motor control circuit.

FIG. 1 depicts an example of a basic, PC board based reflective optical incremental rotary encoder assembly. The components are shown mounted on the back end of a fractional horsepower motor. The reflective code disc is mounted to the hub with the artwork including reflective and non-reflective bars facing downward toward the encoder module. The encoder module chip is surface-mounted or plug-in mounted to the PC board assembly which is in turn mounted to the encoder base and motor. The hub is then assembled to the motor shaft with a small gap between the code disc and the encoder module. In most cases, an output connector is mounted to the PC board joined with wire leads or cable (not shown) exiting the cover.

Prior art encoders require separate and different components to match each different resolution. There is therefore a need in the art for standardized components which have the versatility to be reconfigured to provide different resolutions without requiring additional parts.

SUMMARY OF THE INVENTION

In order to advance the state of the art, the present invention provides a unique rotary incremental reflective optical encoder having multiple resolution capabilities achievable by the fewest number of parts. The basic components are those shown in FIG. 1 but with a modified PC board and code disc. This object of the invention is achieved by providing a single circuit board platform with multiple chip buses electrically connected in parallel and located in different positions, each adjacent to a different code disc track wherein the code disc includes multiple concentric tracks of different resolution.

The design incorporates a single, multi-resolution, multi-track, reflective code disc working in conjunction with a surface-mounted or plug-in mounted encoder module assembled to a printed circuit board platform having alternate disc track read locations provided by separate encoder module bus ports. To change resolution, the encoder module chip is simply moved from one bus to an alternate resolution bus on the PC board that lies adjacent a different code disc resolution track. Compared to conventional encoder designs, this innovative concept provides a wide range of resolutions using just a few basic parts. The main active parts of the invention include an optical rotary encoder, a single PC board supporting two or more encoder chip buses, and an encoder module chip.

More specifically, a position transducer comprises an encoder device with a surface having a plurality of tracks, each track containing a different resolution density of opaque and reflective lines. A support holds three or more plug-in or surface-mount type encoder buses, each of which are located adjacent a different track on the encoder surface. The buspads include sockets for releasably receiving pins of the encoder module. A selectively positionable encoder module is located in a first bus for detecting the encoder surface track lines while all the other buses are vacant. The buses are connected in parallel to a signal processing device and when the encoder module is transferred from the first bus to any other bus, the transducer resolution is altered because the encoder module now reads a different track on the encoder surface which has a different resolution density. Preferably, the invention utilizes a code disc for the encoder surface which is mounted on the rotary shaft of an electric motor. The support is most advantageously a PC board which is mounted to the housing of the electric motor.

Thus, the object of this invention, to utilize a single PC board/platform that can accommodate multiple encoder chip positions used in conjunction with a single code disc to achieve different resolutions, has been achieved. The benefit of this device is to reduce the number of manufactured parts contained within one mechanical encoder assembly while providing multiple encoder resolution capability. The result is a greater choice of resolutions within one configuration, thus providing simplicity, ease of manufacturing and economy. Other objects and advantages of the invention will

DESCRIPTION OF THE PREFERRED EMBODIMENT

The invention comprises three active components: a surface mount encoder module, a multi-tracked reflective code disc, and a PC board with alternate surface mount pads for the encoder module. Each surface mount pad or plug-in type socket is an electrical bus which mechanically and electrically connects the chip module to the motor controller circuitry. For plug-in type modules, pins extend from the chip module and plug directly into sockets of the pad, holding the module in a fixed position with respect to the code disc. As an example, the PC board in this instance is approximately 2½" in diameter and the disc is approximately 2¼" in diameter.

Each pad position on the PC board is fixed at a distance from the shaft that corresponds to a different track radius of the code disc. For example, in FIG. 2, a (75) LPI (line per inch) encoder chip is mounted to the PC board in the 500 CPR (counts per revolution) position to read the 500 CPR track. If it were desired to change the resolution to 150 CPR, then the encoder module would be removed and remounted on the buspad A adjacent the 150 CPR code disc track. Similarly, the encoder chip may be moved to other pads positioned to read their corresponding code disc track. Since the buspads are electrically connected to the motor controller circuitry in parallel, one code disc and one PC board can provide multiple resolutions.

Figure 1:
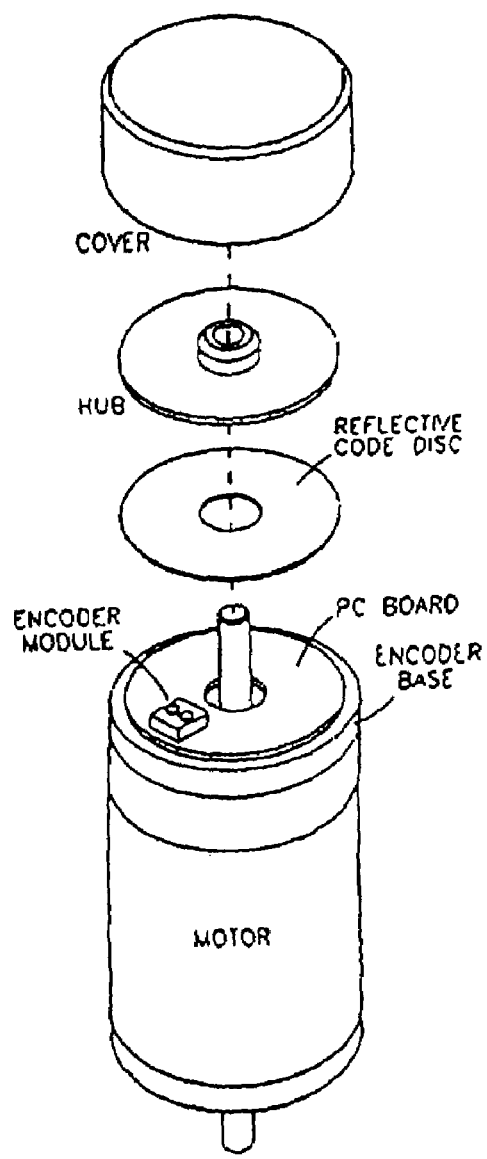
FIG. 1 is a top front isometric view of typical prior art motor construction utilizing an optical rotary encoder.
Figure 2:
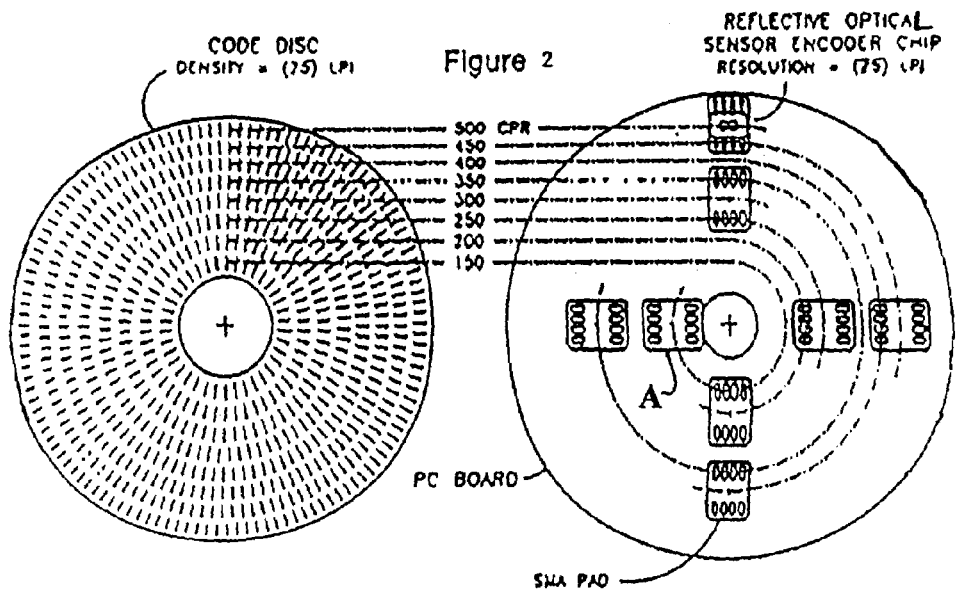
FIG. 2 is a diagram showing the present invention.
Figure 3:
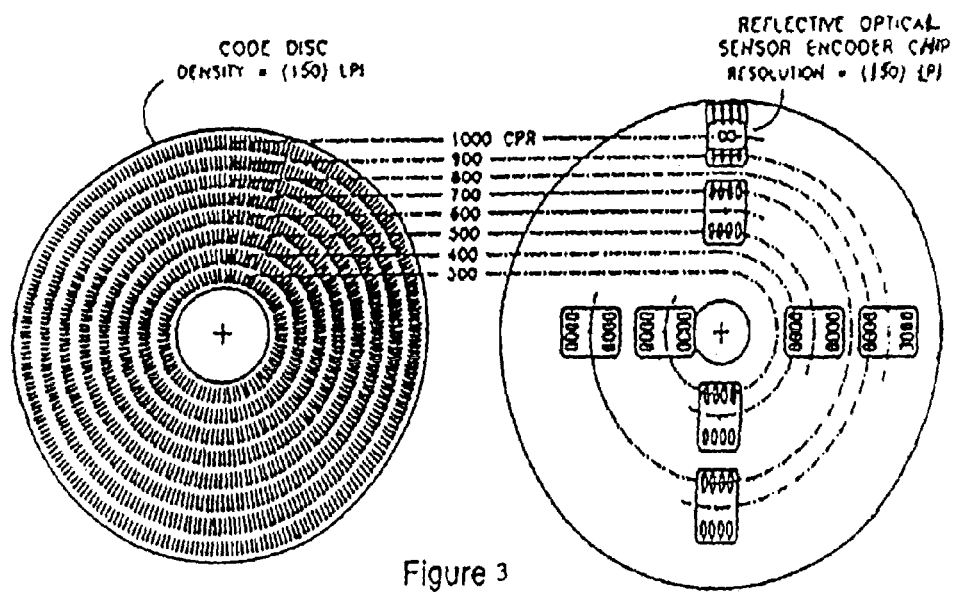
FIG. 3 is a diagram showing an alternate embodiment of the present invention.

FIG. 3 further demonstrates the flexibility of the invention in that it can extend to a greater range of line count options while using the same PC board as FIG. 2 if another code disc and another encoder chip are used. The differences are that a (150) LPI encoder chip is substituted in combination with a code disc having twice the number of lines on each individual track. Note that each line count option has now doubled while the PC board and the disc remains the same physical size.

With this arrangement utilizing the availability of two code discs and two chip modules, thirteen different resolutions may be achieved with a minimum number of parts. The PC board in this example supports six separate encoding resolutions by way of the dual use for each of the eight encoder pad/positions.

The clear advantages of these structures are that the same component size allows both low resolution and high resolution configurations to utilize the same hub, mounting hardware, base and cover components. Conventional encoders currently available using the reflective technology use a separate disc, PC board, and even different package components to accommodate an extended range of resolutions. This encoder design can offer as many as thirteen separate resolutions while using only four basic components. This minimal use of components obviously translates into cost savings such as component or high volume part price breaks, inventory reduction and standard overhead.

Both the encoder platform and code disc concepts are not limited to what is contained or described in the specific design example. For example, the concept embraces both rotary and linear encoders. It will be understood to those of skill in the art that there may be many modifications and adaptations of the invention other than those specifically described from the foregoing description of the preferred embodiment, however the present invention should be limited only by the following claims and their legal equivalents.

What is claimed is:

1. A position transducer, comprising:
    an encoder device with a surface having a plurality of tracks, each track containing a different resolution density of opaque and reflective lines;
    a support holding three or more encoder buses, each bus located adjacent a different track on said encoder surface, said buses adapted for releasably receiving an encoder module;
    means for moving said encoder device with respect to said support;
    a selectively-positionable encoder module located on a first bus for detecting said encoder surface track lines while all other buses are vacant; and
    a signal processing device arranged for receiving signals from said encoder buses, said buses being electrically connected to said processing device in parallel such that the transfer of the encoder module from said first bus to any other of said buses selectively alters the transducer resolution.

2. The transducer of claim 1 wherein said encoder device is a code disc.

3. The transducer of claim 2 wherein said support is a PC board.

4. The transducer of claim 3 wherein said means for moving said encoder device is a rotary shaft.

5. The transducer of claim 4 wherein said rotary shaft is the armature shaft of an electric motor and said PC board is supported by a housing of the electric motor.

6. The transducer of claim 5 wherein said encoder surface is light reflective.

7. The transducer of claim 1 wherein said buses are plug-in type buspads which include sockets for releasably receiving pins of the encoder module.

8. The transducer of claim 1 wherein said encoder module is a surface-mount type module.

* * * * *